United States Patent
Benard

[15] 3,675,024
[45] July 4, 1972

[54] PHOTO-ELECTRIC POSITIONING DEVICE

[72] Inventor: Christian Louis Georges Benard, Paris, France

[73] Assignee: Societe Parisienne des Anciens Etablissements Barbier, Benard & Turenne, Paris, France

[22] Filed: May 26, 1970

[21] Appl. No.: 40,681

[52] U.S. Cl.............................250/208, 356/172
[51] Int. Cl.......................................H01j 39/12
[58] Field of Search...........250/208, 201, 203, 219 D; 356/172

[56] References Cited

UNITED STATES PATENTS 3,207,904   9/1965   Heinz..................................356/172
3,457,422   7/1969   Rottmann........................250/219 DR Primary Examiner—Archie R. Borchelt
Attorney—Karl W. Flocks

[57] ABSTRACT

Photo-electric positioning device for adjustment to a very accurate position in the manufacture of micro-circuits in which the enlarged images of the three first reflecting references drawn on the object to the positioned are centered on second opaque reference marks engraved on a translucent plate, a modulator disk having two concentric tracks rotating on each side of the said opaque references transmitting an identification signal to photo-electric cells which automatically control the lateral displacement of the object to center correctly each image on the corresponding reference mark.

10 Claims, 5 Drawing Figures

3,675,024

PHOTO-ELECTRIC POSITIONING DEVICE

BACKGROUND OF THE INVENTION

The present invention relates to a photo-electric positioning device, and more particularly to a device comprising photo-electric cells, a modulator disc and an optical unit permitting an adjustment having a precision which is independent of the accuracy of the respective positions of the cells, of the light sources and to a certain extent of the centering of the modulator disc.

The adjustment to a very accurate position, for example to within a few microns, in a definite emplacement, of an object movable parallel to a fixed plane is advantageously effected in numerous applications, especially in the case of cutting out in the manufacture of micro-circuits and in numerous machining operations in micro-mechanical work, in which it is necessary to place a piece with great precision with respect to a tool in order to carry out subsequent machining, cutting and like operations. For this purpose, there are frequently employed telescopes aimed in the first place on appropriate reference marks on a typical piece occupying the desired position and then on the other pieces which are to be brought into the same position. This solution necessitates aiming operations which are slow, tiring for the operator's eyes, and subject to human error.

For these reasons, the invention proposes to replace direct sighting by photo-electric servo-control, by means for example of three lenses in front of which three photo-electric cells, replacing the eye of the observer, control from a distance a mechanism which automatically and rapidly carries out the desired aiming operations. However, in order that photo-electric positioning, the bulk of which, it should be noted, is larger than that of simple sighting telescopes, may give the desired results, it is necessary that the lenses should maintain invariable relative positions with a tolerance less than the final error permitted for the accuracy of the desired position. The relative localization to within a few microns of three electronic devices cannot be obtained by simply placing them in position, the more so when the piece to be sighted is of such small size that it becomes necessary to elbow the optical channels, of which only the lenses can be placed side by side directly above the reference marks of the object to be sighted.

SUMMARY OF THE INVENTION

The present invention has therefore for its object a photo-electric servo-control device which is free from the disadvantages referred to. Its essential characteristic feature resides in the fact that each of several lenses supplies an image of a first reference mark drawn on the piece for its accurate positioning. This image is formed in a plane on which a second reference mark has been provided, having a position intended to be at the center of the said image enlarged, the said second reference mark being preferably drawn on a first transparent plate or on sheets of glass stuck on this plate, the said first plate being invariably associated with a second opaque plate fixed to the lenses.

The photo-electric cells corresponding to each reference mark give an error signal which is a function of the lack of coincidence of each reference, and remotely control the mechanisms which bring the piece to be adjusted into the correct position.

The invention also provides an indeformable optical unit and a modulator reading device of high precision.

BRIEF DESCRIPTION OF THE INVENTION

Other characteristic features and advantages will be brought out in the description which follows below with reference to the accompanying drawings, giving by way of indication only and not in any limiting sense two forms of embodiment of the invention.

DESCRIPTION OF THE PREFERRED EMBODIMENTS

Figure 1:
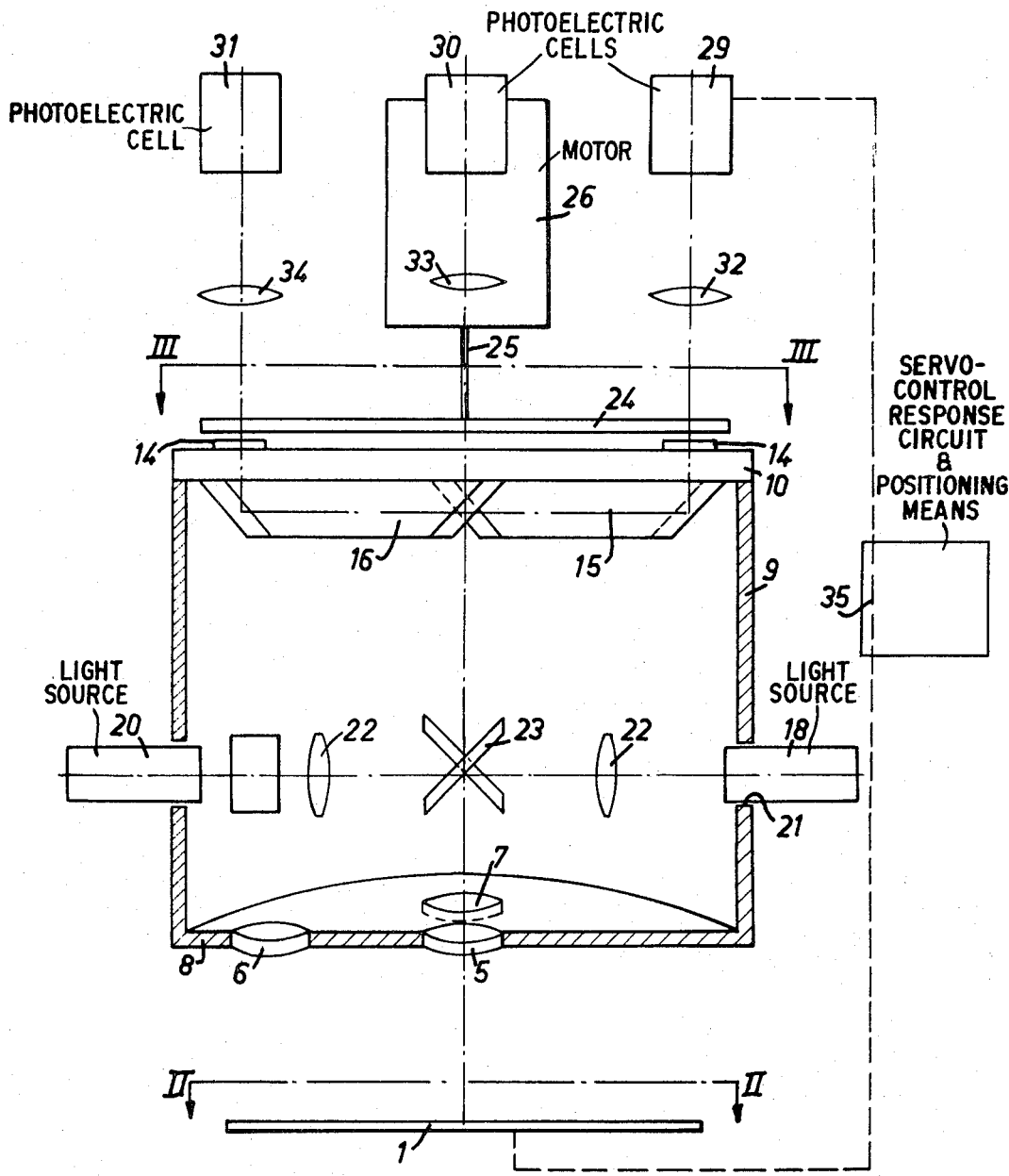
FIG. 1 is a basic diagram of a servo-control according to the invention.
Figure 2:
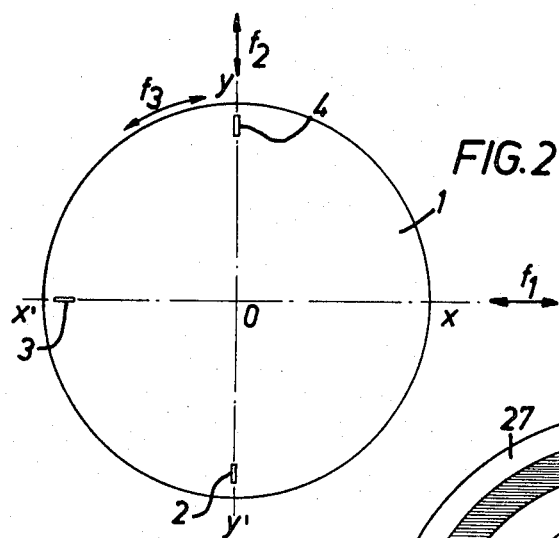
FIG. 2 is a plan view taken along the line II—II of FIG. 1.

There can be seen from FIGS. 1 and 2 an object 1 to be sighted, on which have been drawn three first reference marks 2, 3 and 4, for example in the form of a reflecting deposit of aluminum. The remote-control enables the object 1 to be moved parallel to its plane with three degrees of freedom indicated on FIG. 2 by the lateral arrows $f_1$ and $f_2$ and the rotational arrow $f_3$ about the point 0.

The object 1 is previously placed with an approximate adjustment in such manner that the reference marks 2, 3 and 4 are substantially presented in the optical planes respectively of the lenses 5, 6 and 7.

The lenses 5, 6 and 7 are inset in a plate 8 rigidly fixed to a cylinder 9 closed at its upper portion (see FIG. 1) by a translucent or transparent plate 10.

On the translucent or transparent plate 10 there have been provided three second reference marks 11, 12 and 13, which are for example opaque lines drawn on the plate itself or on small plates 14 stuck on the plate 10.

Three rhombohedral prisms 15, 16 and 17 are stuck beneath the plate 10 in such manner as to transfer respectively on to the second opaque reference marks 11, 12 and 13, the images of the first references 2, 3 and 4.

The optical unit jointly and severally enclosing the lenses 5, 6 and 7 and the prisms 15, 16 and 17 rigidly fixed to the plates 8 and 10, the latter plate bearing the opaque references 11, 12 and 13, is an important feature of the invention.

It can be seen that if light sources 18, and 20 and a third one not shown are provided opposite orifices 21 formed in the cylinder 9, each of the first reference marks 2, 3 and 4 can be illuminated by means of lenses 22 and parallel-face sheets 23. These reference marks being provided in the form of reflecting marks of aluminum, can give through the lenses 5, 6 and 7, the sheets 23 and the prisms 15, 16 and 17, images (not shown) which are substantially centered on the second opaque reference marks 11, 12 and 13 provided above the plate 10 the essential purpose of which will be explained later.

There is provided above the plate 10 a modulator disc 24 supported on a shaft 25 driven by a motor 26, of the synchronous type, for example.

Figure 3:
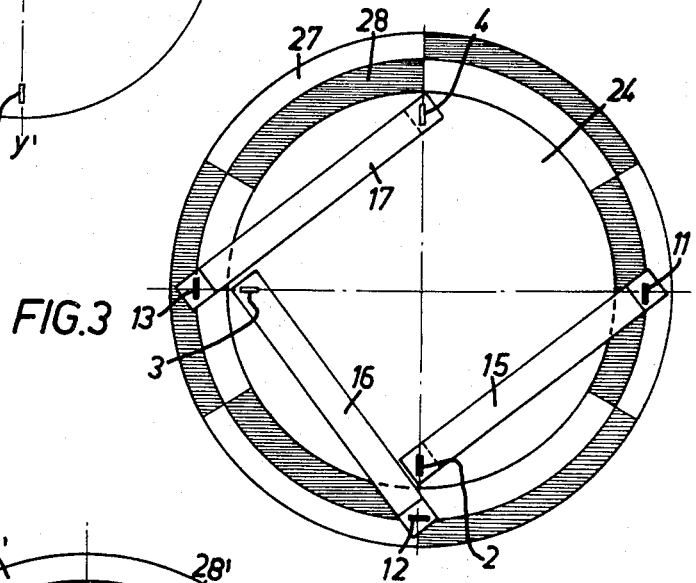
FIG. 3 is a plan view of the modulator device, taken along the line III—III of FIG.1.

On the disc 24 are engraved two concentric tracks 27 and 28 which are alternately transparent and opaque and displaced by a half-period with respect to each other, as shown in FIG. 3. The circle separating the two tracks is arranged substantially so as to pass through the opaque references 11, 12 and 13 at which the images are formed, enlarged for example six times by the lenses 5, 6 and 7, of the reference marks 2, 3 and 4. If the first references 2, 3 and 4 are lines of the same size as the opaque lines of the second references 11, 12 and 13, it can be seen that the images extend widely on each side of the opaque lines.

Each of the tracks 27 and 28 filters the light signal emitted by these images in the form of square periodic signals.

The signals thus emitted by the reflecting lines 2, 3 and 4 are respectively received by the photo cells 29, 30 and 31 through the respective focussing lenses 32, 33 and 34.

By means of three photo-electric servo-control response circuits and positioning means such as that shown diagrammatically at 35, the cells actuate displacements in the form of a positive, negative or null action in one direction or the other indicated by the double arrows $f_1$, $f_2$ and $f_3$, this latter rotation being effected in response to the difference between the signals received by the cells 29 and 31.

In fact, it is only necessary that the image centered on each opaque reference mark such as 11 is displaced in one direction or in the other for the periodic square light signals transmitted by one and the other track to differ in amplitude, and that it results on the photo-electric cells in an order signal, the sign of which may be identified with respect to a reference phase in a manner known per se.

Figure 5:
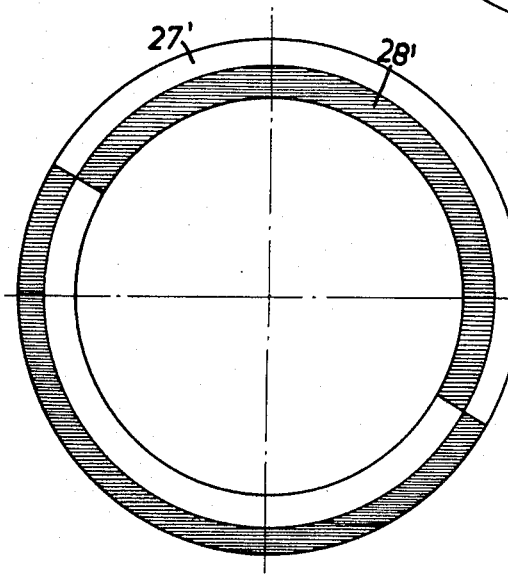
FIG. 5 is a detail view of an alternative form of the modulator device of FIG.3.

The tracks of FIG.3 are provided with three periods per revolution, but there may advantageously be provided two tracks 27' and 28' such as those shown in FIG. 5, with one period per revolution in order to associate the identification with the supply to the synchronous motor.

The function of the second opaque reference marks is especially to define a neutral zone covering as widely as may be desired the centering error of the circle separating the two tracks of the modulator disc, this error being associated with the assembly of the mechanism of rotation of the disc 24 driven by the shaft 25, the accuracy of which can only be technically ensured in a very approximate manner.

It is seen that the sensitivity of the response of the cells 29, 30 and 31 is solely associated with the indeformability of the fixed optical unit 8, 9, 10, the relative positions of the light sources of the lenses 22, the plates 23, the modulator disc 24, the lenses 32 and the cells being capable of being chosen with relatively large tolerances.

At the level of the position reference mark of the object, the invention thus provides a precision of 2 microns which, in view of the magnification (six for example) of the lenses 5, 6, and 7, necessitates an accuracy of reading of 12 microns at the level of the plate 10, whereas the precision which can theoretically be expected at this level of a servo-control device according to the invention, is actually 2 microns.

Figure 4:
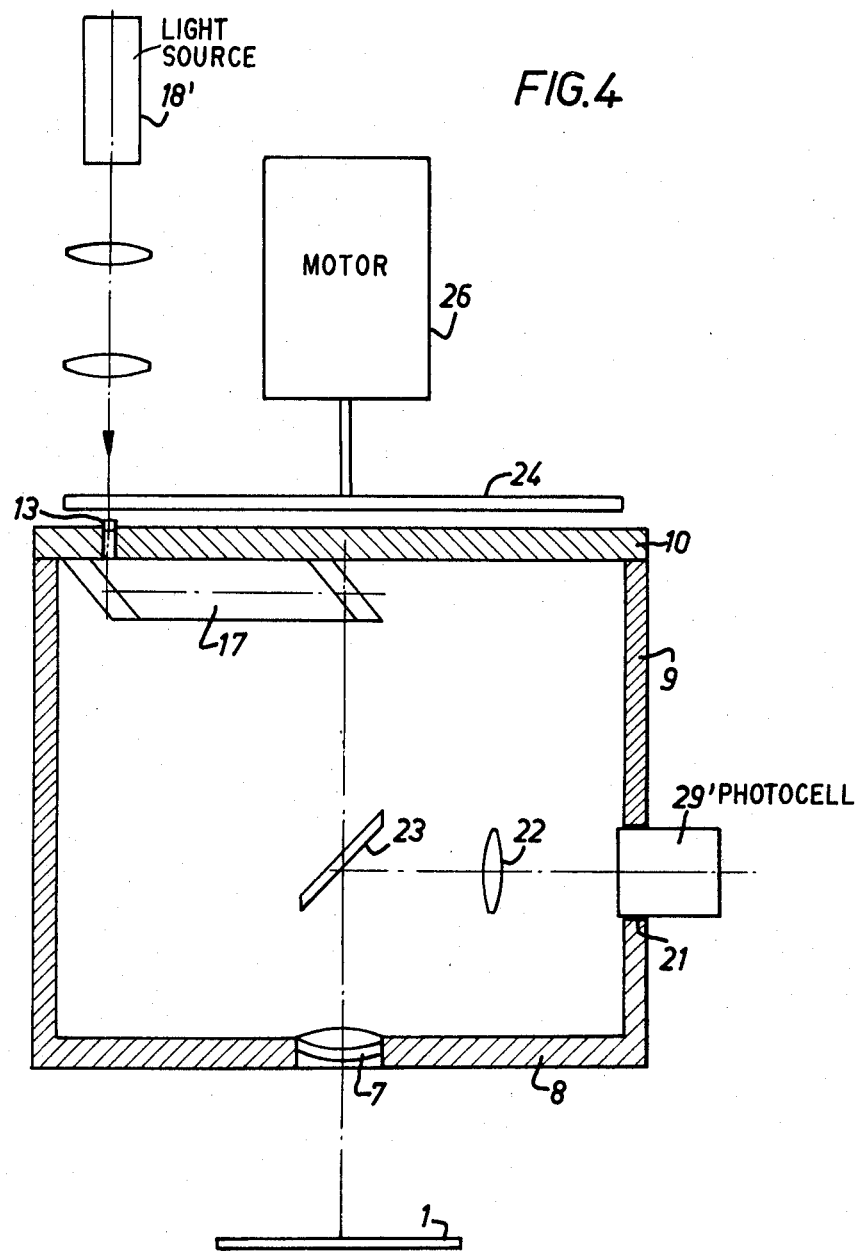
FIG. 4 is a view with parts broken away of an alternative form of FIG.1.

FIG.4 is a view of an alternative form in which the illumination is effected by means of a light source 18' through the disc 24, and these periodic square signals are received on a cell 29' through the orifice 21, which has the advantage of removing the sources of heat 26 and 18' from proximity of the optical unit 8, 9, 10.

It will be understood that the present invention has been described above by way of a simple indication of a preferred example and not in any limitative sense, and that any equivalents may be introduced in its constituent elements without thereby departing from its scope as defined by the appended claims.

What is claimed is:

1. A method of high precision optical positioning, characterized in that it comprises the following steps: illuminating a first reflecting reference mark drawn on the object to be adjusted; receiving the enlarged image of this latter reference on a second opaque reference mark drawn on a transparent plate; causing the passage on each side of the said image centered on the said second reference, of two tracks on a modulator disc alternately opaque and transparent and displaced by a half-period; reading in the form of periodic square optical signals the lateral displacement of the image with respect to its centered position; identifying the sense of the displacement on a photo-electric cell in the form of a positive, negative or neutral signal; and controlling the displacement of the object to be adjusted so that the image of the first reference is correctly centered.

2. A method in accordance with claim 1, characterized in that three first reference marks are provided on the object to be positioned and three second opaque reference marks on the periphery of the transparent plate, the images of the said first references being projected on to the second references by means of rhombohedral prisms secured to the said plate.

3. A method in accordance with claim 2, characterized in that three lenses intended to give the said images of the first references are inset in an opaque plate rigidly coupled to the said transparent plate.

4. A method in accordance with claim 1, characterized in that the said first reference marks are produced by an aluminide deposit.

5. A device for high precision positioning of an object, characterized in that it comprises an object positioning means to move the object parallel to a fixed plane with three degrees of freedom of movement, three remote-control photoelectric cells, each controlling a movement of said positioning means in one degree of freedom in response to a square optical signal, an optical unit transmitting three images of three first reflecting references drawn on the object to be positioned disposed on said positioning means and including a plate allowing the passage of light therethrough on which are engraved three second opaque reference marks, the said images being centered on the said second opaque references, a modulator disc having two concentric tracks rotating on each side of the said opaque references transmitting an identification signal to the said cells.

6. A device in accordance with claim 5, characterized in that said optical unit comprises said light passing plate on which is engraved at least one opaque mark, and further including at least one rhombohedral prism stuck on said plate, an opaque plate in which is inserted at least one magnifying lens, the light passing plate and the opaque plate being rigidly coupled together by means of a mounting cylinder pierced with openings.

7. A device in accordance with claim 6, characterized in that sources of light illuminate said first references through said openings, each cell receiving the square optical signals transmitted by the modulator disc directly through a lens.

8. A device in accordance with claim 6, characterized in that sources of light directly illuminate said modulator disc through a lens, each cell receiving the optical signals through one of the said openings.

9. A device in accordance with claim 5, characterized in that two displacements of said freedom of movement are movements of translation at 90°, each actuated by one of said cells, the third displacement being a rotation in response to the difference between the signals from said two cells.

10. An optical unit characterized in that it comprises a transfer plate on which is engraved at least one opaque mark, at least one rhombohedral prism secured to the said plate, an opaque plate in which is inserted at least one magnifying lens, the transfer plate and the opaque plate being rigidly coupled together by means of a mounting cylinder pierced with openings and a modulator disc in the path of light to said transfer plate.

* * * * *

UNITED STATES PATENT OFFICE
CERTIFICATE OF CORRECTION

Patent No. 3,675,024          Dated July 4, 1972

Inventor(s)     Christian Louis Georges Benard

It is certified that error appears in the above-identified patent and that said Letters Patent are hereby corrected as shown below:

In column 1, after line 9, the following claim for priority should be inserted:

May 27, 1969     France     6917215

Signed and sealed this 12th day of December 1972.

(SEAL)
Attest:

EDWARD M. FLETCHER, JR.          ROBERT GOTTSCHALK
Attesting Officer                Commissioner of Patents